United States Patent
Hanlon (10) Patent No.: US 7,402,358 B2
(45) Date of Patent: Jul. 22, 2008

(54) ELECTROCHEMICAL CELL BIPOLAR PLATE

(75) Inventor: Greg A. Hanlon, Windsor, CT (US)

(73) Assignee: Proton Energy Systems, Inc.CT (US)

( * ) Notice: Subject to any disclaimer, the term of this patent is extended or adjusted under 35 U.S.C. 154(b) by 708 days.

(21) Appl. No.: 10/711,712

(22) Filed: Sep. 30, 2004

(65) Prior Publication Data

US 2006/0068266 A1    Mar. 30, 2006

(51) Int. Cl.
H01M 8/02 (2006.01)
C25B 9/08 (2006.01)

(52) U.S. Cl. .................. 429/39; 204/255; 204/256

(58) Field of Classification Search .................. 429/38, 429/39; 204/255, 256, 257, 258
See application file for complete search history.

(56) References Cited

U.S. PATENT DOCUMENTS

| | | | |
|---|---|---|---|
| 5,441,621 A | 8/1995 | Molter et al. | 204/252 |
| 5,776,624 A | 7/1998 | Neutzler | 429/26 |
| 5,976,726 A | 11/1999 | Wilkinson | 429/35 |
| 6,017,649 A | 1/2000 | Pondo | 429/35 |
| 6,037,075 A | 3/2000 | Critz | 429/36 |
| 6,099,716 A | 8/2000 | Molter | 205/687 |
| 6,103,413 A | 8/2000 | Hinton et al. | 429/32 |
| 6,255,012 B1 | 7/2001 | Wilson et al. | 429/38 |
| 6,261,710 B1 | 7/2001 | Marianowski | 429/34 |
| 6,410,179 B1 * | 6/2002 | Boyer et al. | 429/39 |
| 6,503,653 B2 | 1/2003 | Rock | 429/35 |
| 6,706,436 B2 | 3/2004 | Molter | 429/34 |
| 2003/0203260 A1 | 10/2003 | Lee | 429/26 |

FOREIGN PATENT DOCUMENTS

| | | |
|---|---|---|
| EP | 1284512 A2 | 2/2003 |
| JP | 2004-47451 | 2/2004 |

OTHER PUBLICATIONS

Computer-generated English translation, from the Japanese Patent Office website, of JP-2004-047,451 (doc date Feb. 2004).*
International Search Report PCT/US2005/035269 dated Sep. 28, 2005.

* cited by examiner

Primary Examiner—Stephen J. Kalafut
(74) Attorney, Agent, or Firm—Cantor Colburn LLP (57) ABSTRACT

A bipolar plate for an electrochemical cell is disclosed. The bipolar plate includes a unitary plate having first and second inlet ports, first and second outlet ports, first flow channels, and second flow channels. A first inlet header channel at one end of the first flow channels is in fluid communication with the first inlet port, and a first outlet header channel at the other end of the first flow channels is in fluid communication with the first outlet port. A second inlet header channel at one end of the second flow channels is in fluid communication with the second inlet port, and a second outlet header channel at the other end of the second flow channels is in fluid communication with the second outlet port. Each of the header channels includes a support surface sufficient to support a membrane-electrode-assembly while providing a fluid flow channel from one end of the respective header channel to the other end.

19 Claims, 7 Drawing Sheets

ELECTROCHEMICAL CELL BIPOLAR PLATE

BACKGROUND OF INVENTION

The present disclosure relates generally to electrochemical cells, and particularly to electrochemical cells having a bipolar plate.

Figure 1:
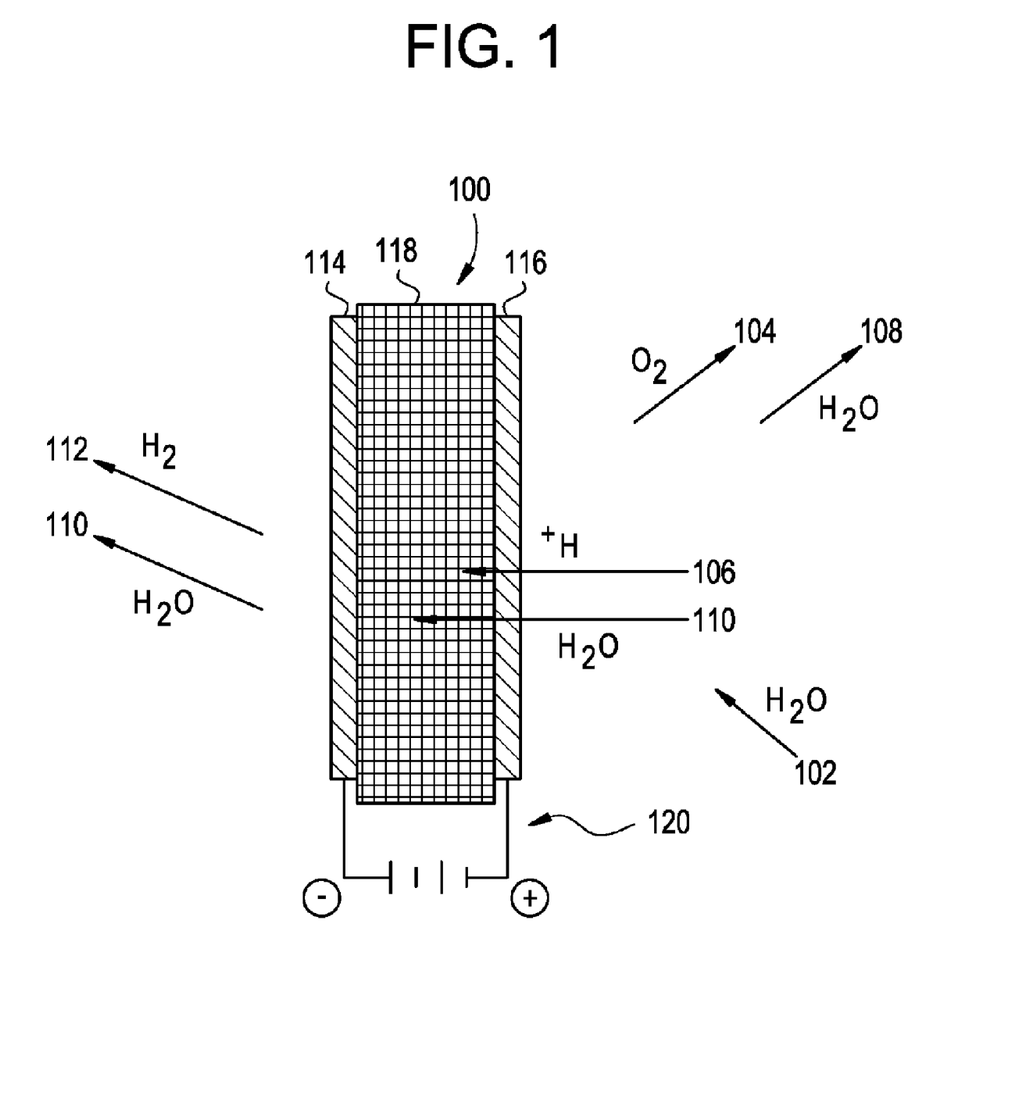
FIG. 1 depicts a schematic diagram of a partial electrochemical cell showing an electrochemical reaction for use in accordance with embodiments of the invention.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exits cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catatlyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells may be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode-assembly", or "MEA") typically has a first flow field in fluid communication with the cathode and a second flow field in fluid communication with the anode. The MEA may furthermore be supported on both sides by screen packs or bipolar plates that are disposed within, or that alternatively define, the flow fields. Screen packs or bipolar plates may facilitate fluid movement to and from the MEA, membrane hydration, and may also provide mechanical support for the MEA.

In order to maintain intimate contact between cell components under a variety of operational conditions and over long time periods, uniform compression may be applied to the cell components. Pressure pads or other compression means are often employed to provide even compressive force from within the electrochemical cell.

While existing internal components are suitable for their intended purposes, there still remains a need for improvement, particularly regarding cell efficiency at lower cost, weight and size. Accordingly, a need exists for improved internal cell components of an electrochemical cell, and particularly bipolar plates, that can operate at sustained high pressures, while offering a low profile configuration.

BRIEF DESCRIPTION OF THE INVENTION

Embodiments of the invention include a bipolar plate for an electrochemical cell having a membrane-electrode-assembly (MEA) and capable of operating at a pressure difference across the MEA of equal to or greater than about 50 pounds-per-square-inch (psi). The bipolar plate includes a unitary plate having first and second sides, first and second inlet ports, first and second outlet ports, a first plurality of flow channels, and a second plurality of flow channels. The first plurality of flow channels are oriented in a first direction at the first side, a first inlet header channel at one end of the first plurality of flow channels is in fluid communication with the first inlet port, and a first outlet header channel at the other end of the first plurality of flow channels is in fluid communication with the first outlet port. The second plurality of flow channels are oriented in a second different direction at the second side, a second inlet header channel at one end of the second plurality of flow channels is in fluid communication with the second inlet port, and a second outlet header channel at the other end of the second plurality of flow channels is in fluid communication with the second outlet port. Each of the header channels includes a support surface sufficient to support the MEA at the operating pressure difference while providing a fluid flow channel from one end of the respective header channel to the other end.

Other embodiments of the invention include an electrochemical cell having membrane-electrode-assemblies (MEAs) alternatively arranged with flow field members between a first cell separator plate and a second cell separator plate, wherein the flow field members include a bipolar plate as previously described. Here, each of the header channels includes a support surface sufficient to support the MEA at an operating pressure difference across the MEA of equal to or greater than about 50 pounds-per-square-inch (psi) while providing a fluid flow channel from one end of the respective header channel to the other end.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide a bipolar plate for an electrochemical cell, where the bipolar plate is fabricated from a unitary plate using a chemical etching process to discriminatingly remove material to form flow channels thereon. While embodiments disclosed herein describe chemical etching as an exemplary material-removing process, it will be appreciated that the disclosed invention may also be applicable to other material-removing processes, such as micro-machining, for example.

Figure 2:
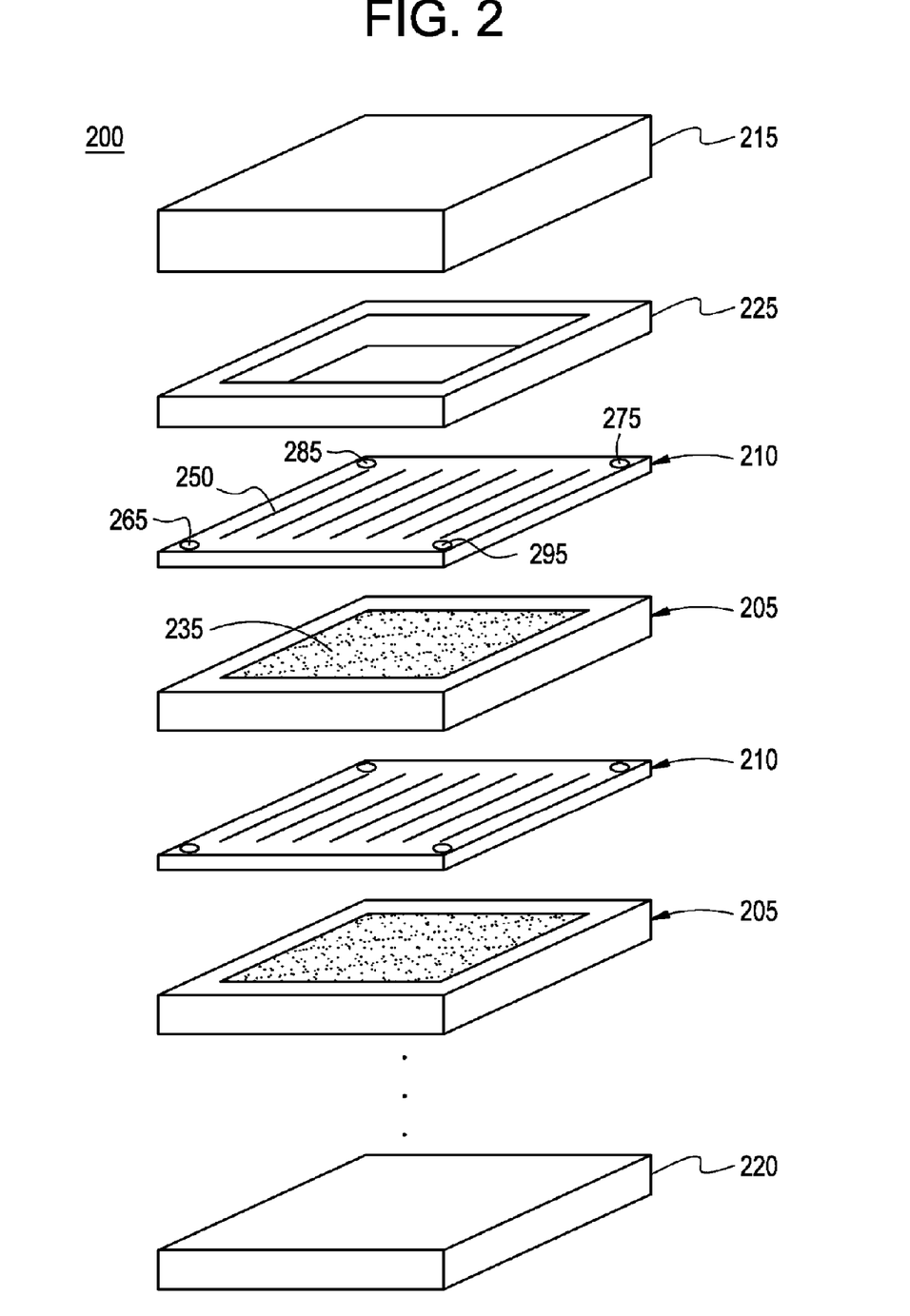
FIG. 2 depicts an exploded assembly isometric view of an exemplary electrochemical cell in accordance with embodiments of the invention.
Figure 3:
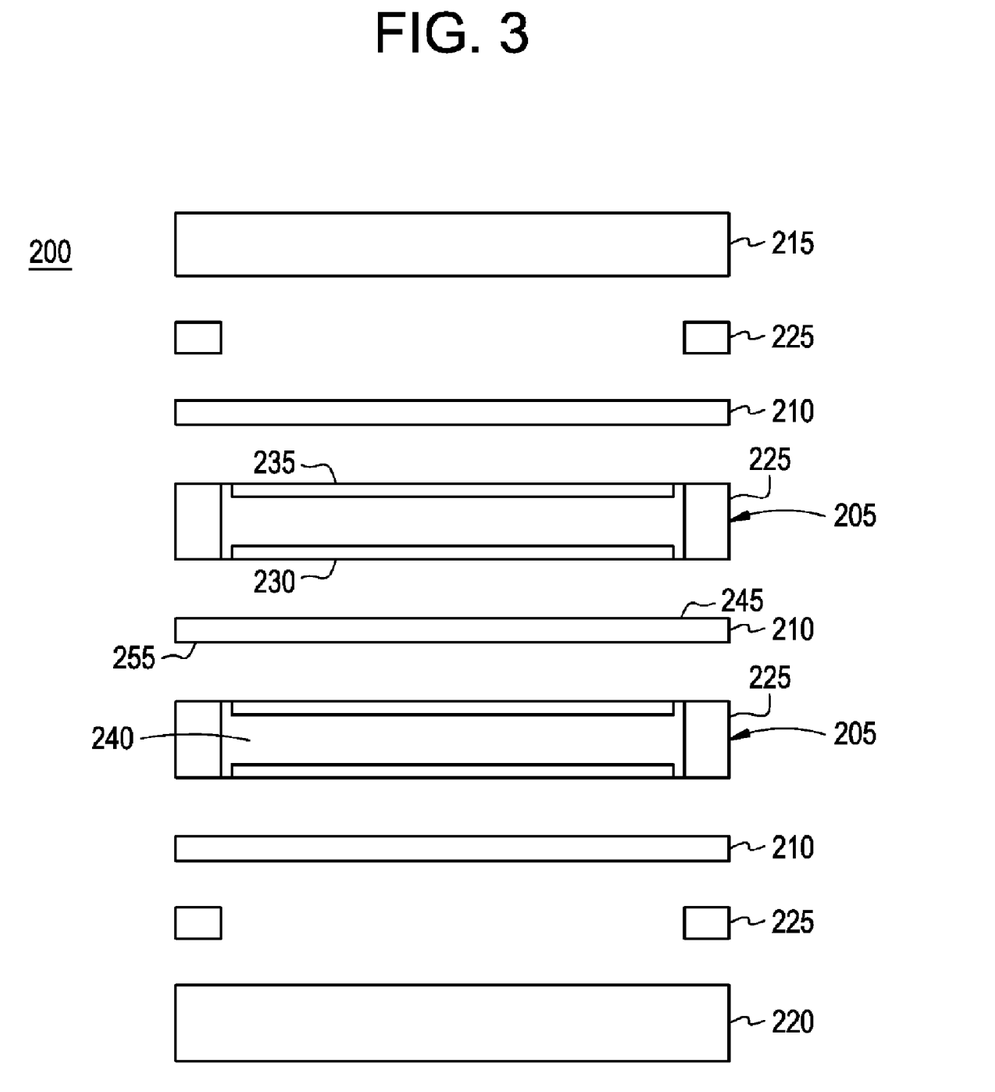
FIG. 3 depicts an exploded assembly section view similar to the assembly of FIG. 2.

Referring now to FIGS. 2 and 3, an exemplary electrochemical cell (cell) 200 that may be suitable for operation as an anode feed electrolysis cell, cathode feed electrolysis cell, fuel cell, or regenerative fuel cell is depicted in an exploded assembly isometric view. Thus, while the discussion below may be directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 A/ft$^2$ (amperes per square foot) and about 4,000 A/ft$^2$. When used as a fuel cells power outputs range between about 0.4 volts and about 1 volt, and between about 0.1 A/ft$^2$ and about 10,000 A/ft$^2$. The number of cells within the stack, and the dimensions of the individual cells is scalable to the cell power output and/or gas output requirements. Accordingly, application of electrochemical cell 200 may involve a plurality of cells 200 arranged electrically either in series or parallel depending on the application. Cells 200 may be operated at a variety of pressures, such as up to or exceeding 50 psi (pounds-per-square-inch), up to or exceeding about 100 psi, up to or exceeding about 500 psi, up to or exceeding about 2500 psi, or even up to or exceeding about 10,000 psi, for example.

In an embodiment, cell 200 includes a plurality of membrane-electrode-assemblies (MEAs) 205 alternatively arranged with a plurality of flow field members 210 between a first cell separator plate 215 and a second cell separator plate 220. In an embodiment, flow field members 210 are bipolar plates, which are also herein referenced by numeral 210. Gaskets 225 may be employed generally for enhancing the seal between the first and second cell separator plates 215, 220 and the associated bipolar plate 210, and between MEA 205 and an adjacent bipolar plate 210.

MEA 205 has a first electrode (e.g., anode, or oxygen electrode) 230 and a second electrode (e.g., cathode, or hydrogen electrode) 235 disposed on opposite sides of a proton exchange membrane (membrane) 240, best seen by referring to FIG. 3. Bipolar plates 210, which are in fluid communication with electrodes 230 and 235 of an adjacent MEA 205, have a structure, to be discussed in more detail below, that define the flow fields adjacent to electrodes 230 and 235. The cell components, particularly cell separator plates (also referred to as manifolds) 215, 220, bipolar plates 210, and gaskets 225, may be formed with suitable manifolds or other conduits for fluid flow.

In an embodiment, membrane 240 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 230 and 235 may comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys of at least one of the foregoing catalysts, and the like. Electrodes 230 and 235 may be formed on membrane 240, or may be layered adjacent to, but in contact with, membrane 240.

Figure 4:
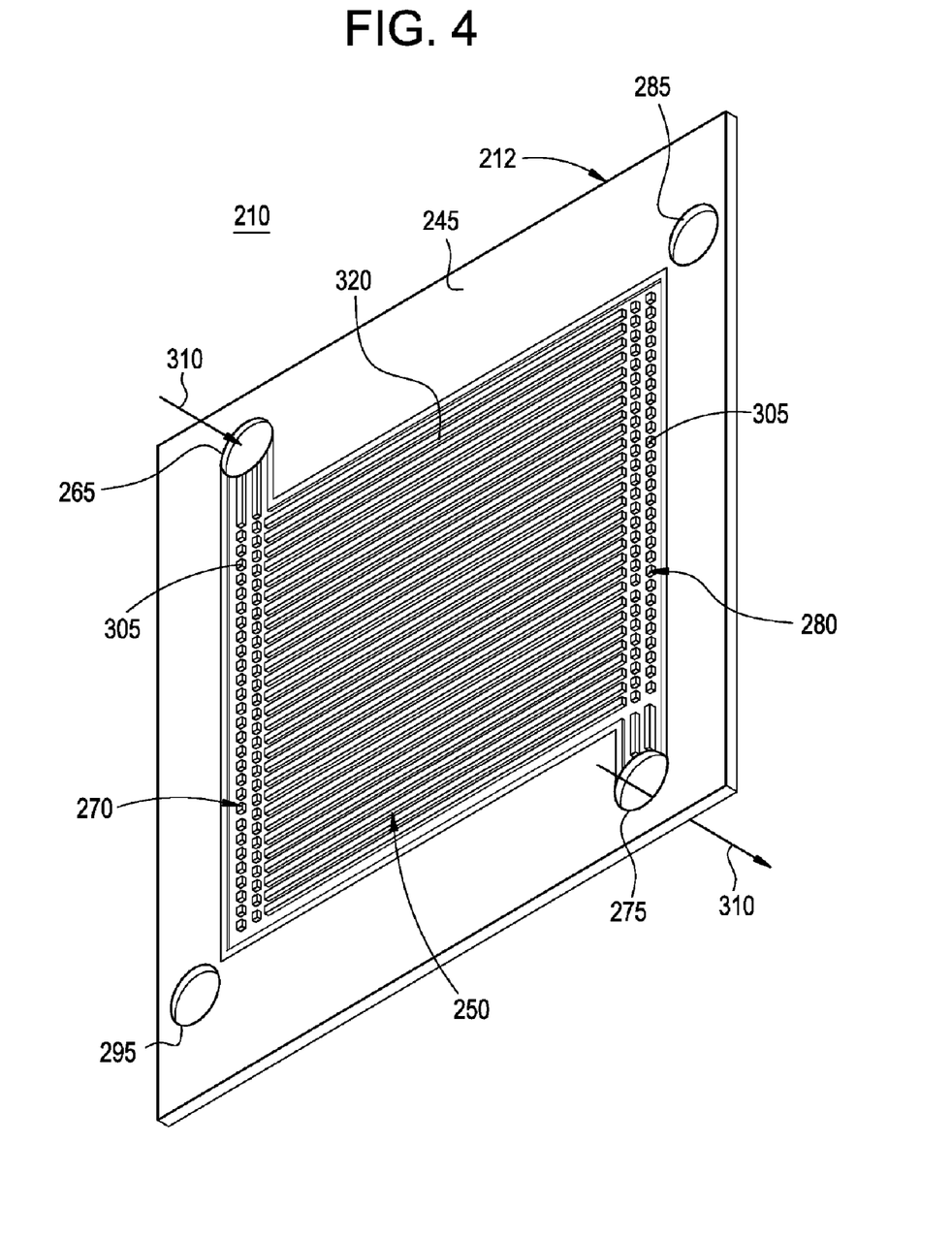
FIG. 4 depicts a first side of a unitary bipolar plate in accordance with an embodiment of the invention.
Figure 5:
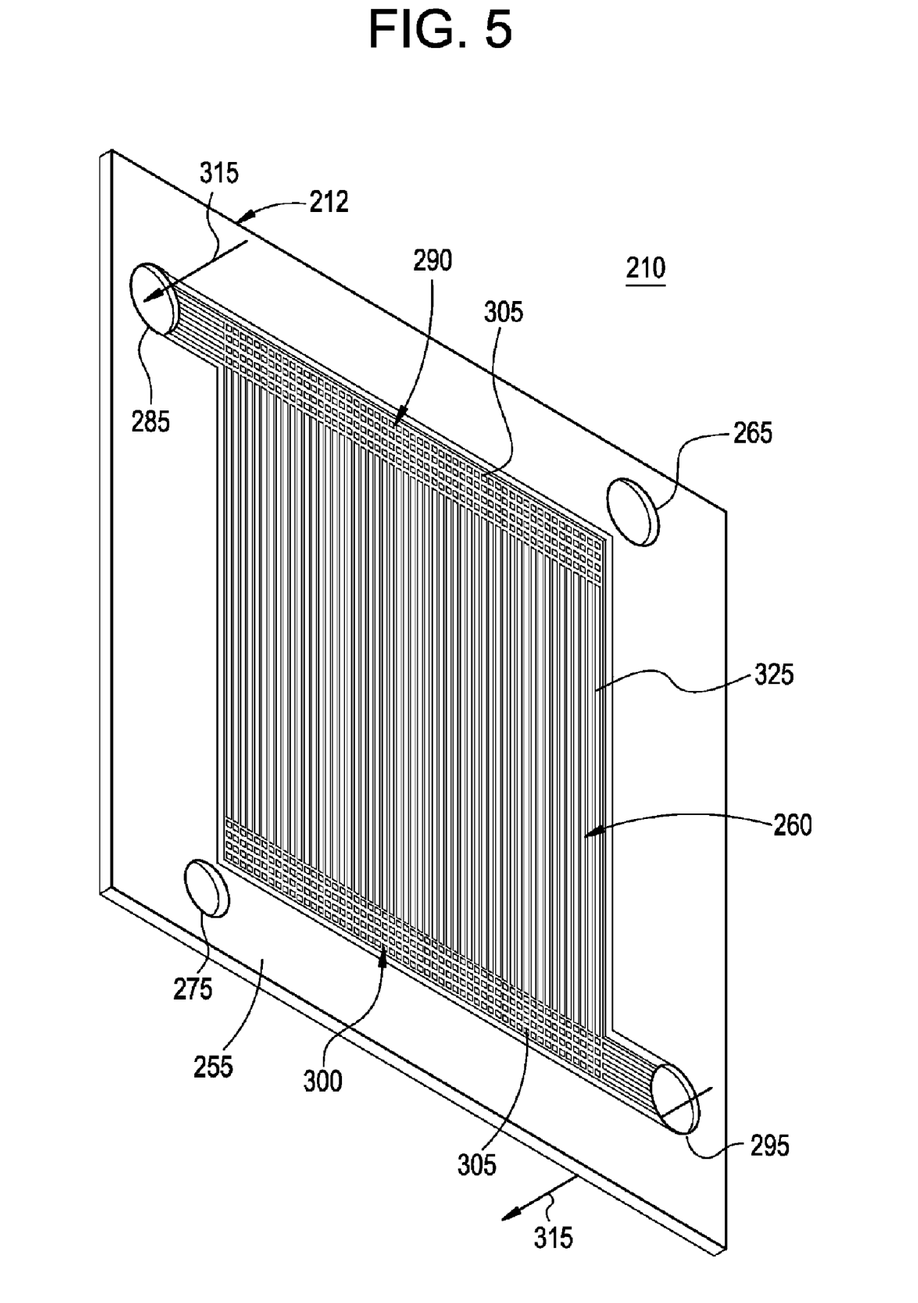
FIG. 5 depicts a second side of the unitary bipolar plate of FIG. 4.

In an embodiment, and referring now to FIGS. 4 and 5, bipolar plate 210 is made from a unitary plate 212 of titanium, zirconium, stainless steel, or any other material found to be suitable for the purposes disclosed herein, such as niobium, tantalum, carbon steel, nickel, cobalt, and associated alloys, for example. FIG. 4 depicts a first side 245 (front side view) of the unitary plate 212 having a first plurality of flow channels 250 oriented in a first direction, and FIG. 5 depicts a second side 255 (rear side view) of the same unitary plate 212 having a second plurality of flow channels 260 oriented in a second different direction. The first side 245 includes a first inlet port 265 in fluid communication with a first inlet header channel 270 that extends across one end of the first plurality of flow channels 250, and a first outlet port 275 in fluid communication with a first outlet header channel 280 that extends across the other end of the first plurality of flow channels 250. The second side 255 includes a second inlet port 285 in fluid communication with a second inlet header channel 290 that extends across one end of the second plurality of flow channels 260, and a second outlet port 295 in fluid communication with a second outlet header channel 300 that extends across the other end of the second plurality of flow channels 260. Each header channel 270, 280, 290, 300 includes a support surface 305, or a plurality of support surfaces 305, sufficient to support the MEA 205 at the operating pressure difference of equal to or greater than about 50 psi, or more preferably equal to or greater than about 100 psi, while providing a fluid flow channel from one end of the respective header channel to the other end.

The first inlet port 265, the first inlet header channel 270, the first plurality of flow channels 250, the first outlet header channel 280, and the first outlet port 275, collectively define a first fluid flow path (flow field), depicted generally as arrow 310, on the first side 245 of unitary plate 212. Similarly, the second inlet port 285, the second inlet header channel 290, the second plurality of flow channels 260, the second outlet header channel 300, and the second outlet port 295, collectively define a second fluid flow path (flow field), depicted generally as arrow 315, on the second side 255 of unitary plate 212. As depicted in FIGS. 4 and 5, the first flow path 310 is isolated from (absent fluid communication with) the second flow path 315.

Figure 6:
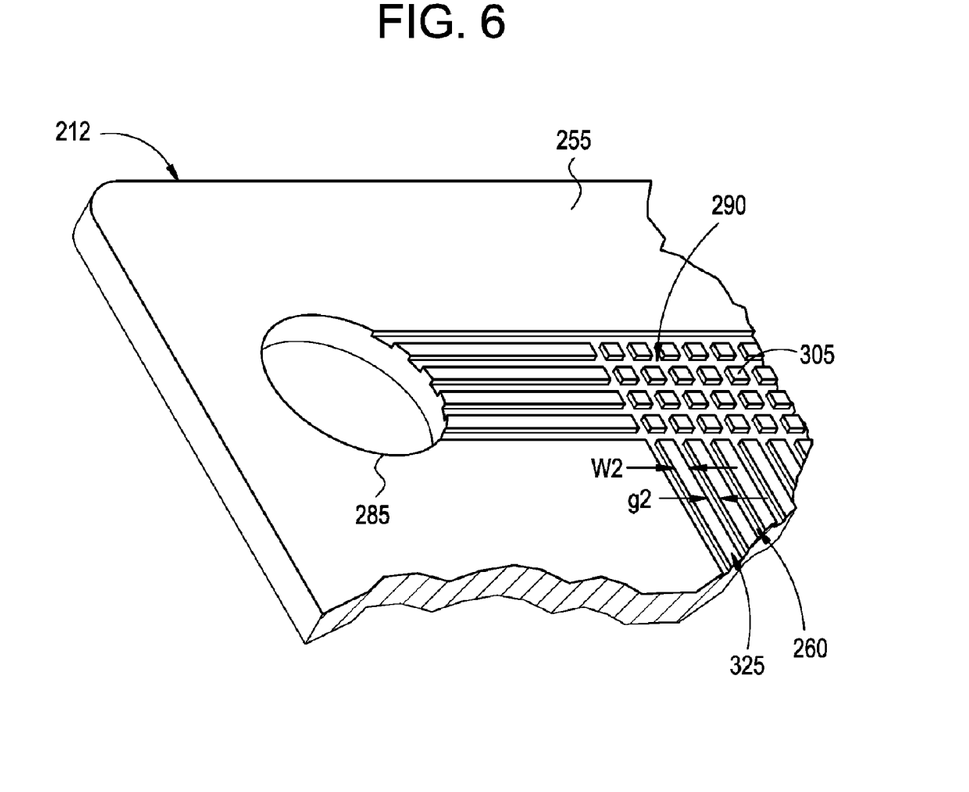
FIG. 6 depicts an expanded view of a portion of the first side of the unitary bipolar plate of FIG. 4.

As a result of a chemical etching process, or any other material removal process suitable for the purposes disclosed herein, the first side 245 also includes a first plurality of support ridges 320 disposed in an alternating arrangement with the first plurality of flow channels 250, and the second side 255 includes a second plurality of support ridges 325 disposed in an alternating arrangement with the second plurality of flow channels 260. The ridges 325 and channels 260 of second side 255 are depicted in FIG. 6, which is specifically illustrative of second side 255 but may also represent the ridges and channels of first side 245, which is best seen by referring to FIG. 7. In an embodiment and with reference to FIG. 7, each of the first plurality of support ridges 320 have a width w1, and each of the first plurality of flow channels 250 have a width g1, where in an embodiment the width w1 is equal to or greater than the width g1. Additionally and with reference back to FIG. 6, each of the second plurality of support ridges 325 have a width w2, and each of the second plurality of flow channels 260 have a width g2, where in an embodiment the width w2 is equal to or greater than the width g2. While only width w2 and width g2 of the second side 255 are depicted in FIG. 6, it will be appreciated that width w1 and width g1 of the first side 245 may be similarly illustrated (see FIG. 7 for example). In an embodiment, the width w1 is greater than the width w2, and the width g1 is greater than the width g2, thereby resulting in the first side 245 having widths w1 and g1, which are greater than widths w2 and g2, being disposed adjacent first electrode 230 (the oxygen electrode), thereby enabling process water to easily flow through the wider slots of first flow field 310, while still enabling hydrogen gas to easily flow through the narrower slots of second flow field 315.

In an embodiment, and as depicted in FIGS. 4 and 5, the first direction of the first plurality of channels 250 is oriented about 90 degrees to the second direction of the second plurality of channels 260. However, embodiments of the invention are not limited to a 90 degree differential, and the scope of the invention is not intended to be so limited.

FIGS. 2, 4 and 5 also depict first inlet port 265 and first outlet port 275 diagonally disposed with respect to a fluid flow therebetween, where the fluid flow follows an edge-to-edge flow direction as defined by the first plurality of channels 250. Similarly, second inlet port 285 and the second outlet port 295 are diagonally disposed with respect to a fluid flow therebetween. Such a diagonal arrangement of inlet and outlet ports produces a uniform flow path length from inlet to outlet, regardless of whether the fluid flow travels along the flow channel closest to the inlet port or farthest from the inlet port.

Figure 7:
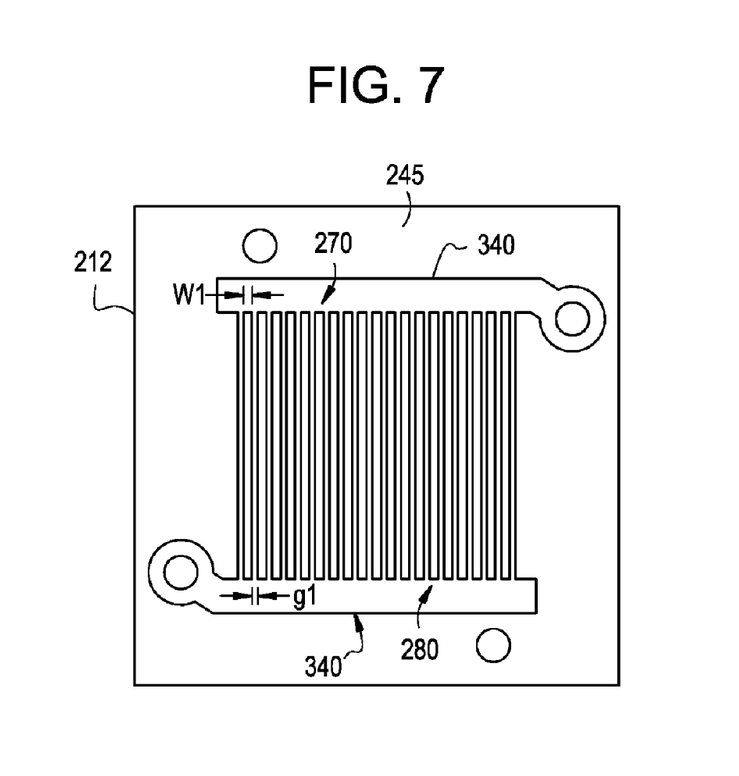
FIG. 7 depicts an exemplary alternative unitary bipolar plate in accordance with an embodiment of the invention.
Figure 8:
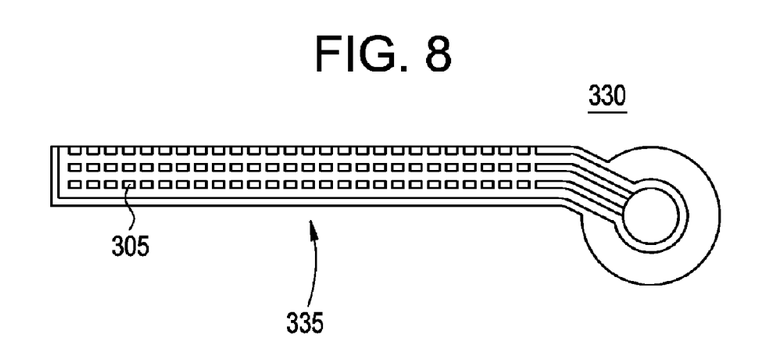
FIG. 8 depicts an exemplary insert for use with the unitary bipolar plate of FIG. 7.

Referring now to FIGS. 7 and 8, an alternative embodiment of the first side 245 of unitary plate 212 is depicted in FIG. 7 having a first inlet header channel 270 and a first outlet header channel 280 absent support surfaces 305. However, in FIG. 8, an insert 330 is depicted having support surfaces 305, and having a shape 335 that mirrors the shape 340 of first inlet header channel 270 and first outlet header channel 280, such that insert 330 will fit within each header channel 270, 280, thereby providing support surfaces 305 to header channel 270, 280. Support surfaces 305 of insert 330 for first side 245 have dimensions comparable to the dimensions w1 and g1 mentioned previously. In a similar fashion, the second side 255 of unitary plate 212 may employ an insert 330 having support surfaces 305 with dimensions comparable to the dimensions w2 and g2 mentioned previously. In an embodiment, insert 330 is made of a similar material as used for unitary plate 212.

While embodiments of the invention have been described having a linear arrangement of a first 250 and a second 260 plurality of flow channels in the first 245 and the second 255 sides, respectively, it will be appreciated that the scope of the invention is not so limited, and that the invention may also apply to pluralities of flow channels having non-linear configurations.

As disclosed, some embodiments of the invention may include some of the following advantages: a low cost, compact bipolar plate that may be fabricated by low cost manufacturing methods to provide a low profile electrochemical cell arrangement; a unitary bipolar plate suitable for operating within an electrochemical cell at pressure differentials in excess of 50 psi, where the cell may operate as a low-pressure electrolysis cell, which has a typical operating pressure on the order of 200 psi or higher, or a high-pressure fuel cell, which has a typical operating pressure on the order of 20 psi or lower; and, a unitary bipolar plate arrangement that may have complex flow features and/or paths chemically etched or micro-machined onto each side.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bipolar plate for an electrochemical cell having a membrane-electrode-assembly (MEA) and capable of operating at a pressure difference across the MEA of equal to or greater than about 50 pounds-per-square-inch (psi), the bipolar plate comprising:
   a unitary plate having first and second sides, first and second inlet ports, and first and second outlet ports;
   a first plurality of flow channels continuously oriented in a first direction at the first side, a first inlet header channel at one end of the first plurality of flow channels and in fluid communication with the first inlet port, and a first outlet header channel at the other end of the first plurality of flow channels and in fluid communication with the first outlet port; and
   a second plurality of flow channels continuously oriented in a second different direction at the second side, a second inlet header channel at one end of the second plurality of flow channels and in fluid communication with the second inlet port, and a second outlet header channel at the other end of the second plurality of flow channels and in fluid communication with the second outlet port;
   wherein each of the header channels comprises a support surface sufficient to support the MEA at the operating pressure difference while providing a fluid flow channel from one end of the respective header channel to the other end, and wherein each of said header channels includes third a plurality of channels extending perpendicular to the respective flow channels.

2. The bipolar plate of claim 1, wherein:
   the first direction is oriented about 90 degrees to the second direction.

3. The bipolar plate of claim 1, wherein:
   the first inlet port and the first outlet port are diagonally disposed with respect to a fluid flow therebetween; and
   the second inlet port and the second outlet port are diagonally disposed with respect to a fluid flow therebetween.

4. The bipolar plate of claim 1, wherein:
   the first side further comprises a first plurality of support ridges in an alternating arrangement with the first plurality of flow channels; and
   the second side further comprises a second plurality of support ridges in an alternating arrangement with the second plurality of flow channels.

5. The bipolar plate of claim 4, wherein:
   the first plurality of support ridges have a first width equal to or greater than the width of the first plurality of flow channels; and
   the second plurality of support ridges have a second width equal to or greater than the width of the second plurality of flow channels.

6. The bipolar plate of claim 5, wherein:
   the first width is greater than the second width.

7. The bipolar plate of claim 1, wherein:
   the first inlet port, the first inlet header channel, the first plurality of flow channels, the first outlet header channel, and the first outlet port, define a first flow path;
   the second inlet port, the second inlet header channel, the second plurality of flow channels, the second outlet header channel, and the second outlet port, define a second flow path; and
   the first flow path is isolated from the second flow path.

8. The bipolar plate of claim 1, wherein:
   the unitary plate is made from titanium, zirconium, stainless steel, or any combination comprising at least one of the foregoing materials.

9. The bipolar plate of claim 1, wherein:
   at least one of the header channels comprises an insert, the insert having the support surface on a first side, and wherein said third plurality of channels extending perpendicular to said respective flow channels is formed by protrusions on a second side of said insert.

10. The bipolar plate of claim 9, wherein:
    the insert is made from titanium, zirconium, stainless steel, or any combination comprising at least one of the foregoing materials.

11. The bipolar plate of claim 1, wherein:
    each of the header channels comprises a support surface sufficient to support the MEA at an operating pressure difference across the MEA of equal to or greater than about 100 psi while providing a fluid flow channel from one end of the respective header channel to the other end.

12. An electrochemical cell, comprising:
    a plurality of membrane-electrode-assemblies (MEAs) alternatively arranged with a plurality of flow field members between a first cell separator plate and a second cell separator plate;
    wherein at least one of the plurality of flow field members comprises a bipolar plate, the bipolar plate comprising:
    a unitary plate having first and second sides, first and second inlet ports, and first and second outlet ports;
    a first plurality of flow channels continuously oriented in a first direction at the first side, a first inlet header channel at one end of the first plurality of flow channels and in fluid communication with the first inlet port, and a first outlet header channel at the other end of the first plurality of flow channels and in fluid communication with the first outlet port, wherein said first inlet channel and said first outlet channel are perpendicular to said first plurality of flow channels; and
    a second plurality of flow channels continuously oriented in a second different direction at the second side, a second inlet header channel at one end of the second plurality of flow channels and in fluid communication with the second inlet port, and a second outlet header channel at the other end of the second plurality of flow channels and in fluid communication with the second outlet port, wherein said second inlet channel and said second outlet channel are perpendicular to said second plurality of flow channels;

wherein each of the header channels comprises a support surface sufficient to support the MEA at an operating pressure difference across the MEA of equal to or greater than about 50 pounds-per-square-inch (psi) while providing a fluid flow channel from one end of the respective header channel to the other end.

13. The bipolar plate of the electrochemical cell of claim 12, wherein:
the first direction is oriented about 90 degrees to the second direction;
the first inlet port and the first outlet port are diagonally disposed with respect to a fluid flow therebetween; and
the second inlet port and the second outlet port are diagonally disposed with respect to a fluid flow therebetween.

14. The bipolar plate of the electrochemical cell of claim 13, wherein:
the first inlet port, the first inlet header channel, the first plurality of flow channels, the first outlet header channel, and the first outlet port, define a first flow path;
the second inlet port, the second inlet header channel, the second plurality of flow channels, the second outlet header channel, and the second outlet port, define a second flow path; and
the first flow path is absent fluid communication with the second flow path.

15. The bipolar plate of the electrochemical cell of claim 14, wherein:
at least one of the header channels comprises an insert, the insert having the support surface on a first side and a third plurality of channels on a second side wherein said third plurality of channels is perpendicular to the respective flow channels adjacent said insert.

16. The bipolar plate of the electrochemical cell of claim 15, wherein:
the unitary plate and the insert are made from titanium, zirconium, stainless steel, or any combination comprising at least one of the foregoing materials.

17. A bipolar plate of claim 1 made by the process of chemical etching at least one of the first side and the second side of the unitary plate to produce at least one of the first inlet header channel, the first plurality of flow channels, the first outlet header channel, the second inlet header channel, the second plurality of flow channels, and the second outlet header channel.

18. An electrolysis cell stack for disassociating hydrogen and oxygen from water, said electrolysis cell stack comprising:

a first membrane-electrode-assembly having a first anode and a first cathode disposed on opposite sides of a first membrane;
a second membrane electrode assembly having a second anode and a second cathode disposed on opposite sides of a second membrane;
a bipolar plate having a first side in fluid communication with said first anode and a second side in fluid communication with said second cathode;
wherein said bipolar plate comprises:
a unitary plate having first and second sides, first and second inlet ports, and first and second outlet ports, wherein the material of said unitary plate in continuous from said first side to said second side;
a first plurality of flow channels continuously oriented in a first direction at the first side, a first inlet header channel at one end of the first plurality of flow channels and in fluid communication with the first inlet port, and a first outlet header channel at the other end of the first plurality of flow channels and in fluid communication with the first outlet port, wherein said first inlet channel and said first outlet channel are perpendicular to said first plurality of flow channels; and
a second plurality of flow channels continuously oriented in a second different direction at the second side, a second inlet header channel at one end of the second plurality of flow channels and in fluid communication with the second inlet port, and a second outlet header channel at the other end of the second plurality of flow channels and in fluid communication with the second outlet port, wherein said second inlet channel and said second outlet channel are perpendicular to said second plurality of flow channels;
wherein each of the header channels comprises a support surface sufficient to support said first membrane and said second membrae at an operating pressure difference across said first membrane and said second membrane of equal to or greater than about 50 pounds-per-square-inch (psi) while providing a fluid flow channel from one end of the respective header channel to the other end.

19. The electrolysis cell stack for disassociating hydrogen and oxygen from water of claim 18 wherein at least one of the header channels comprises an insert, the insert having the support surface on a first side and a third plurality of channels on a second side wherein said third plurality of channels is perpendicular to the respective flow channels adjacent said insert.

* * * * *